United States Patent [19]

Person et al.

[11] Patent Number: 5,870,018
[45] Date of Patent: Feb. 9, 1999

[54] AUTOMOTIVE RADIO ANTI-THEFT DEVICE VIA MULTIPLEX BUS

[75] Inventors: Andrew P. Person; James P. Muccioli, both of Farmington Hills, Mich.; Yasuhiko Mukaiyama, Rancho Palos Verdes, Calif.; Kazuma Takeda, Chuoutia Iwaki, Japan

[73] Assignee: Chrysler Corporation, Auburn Hills, Mich.

[21] Appl. No.: 655,302

[22] Filed: May 20, 1996

[51] Int. Cl.⁶ .................................................. B60R 25/10
[52] U.S. Cl. ...................... 340/426; 340/425.5; 340/568; 340/825.24; 340/825.3; 340/825.34; 307/10.2; 455/346
[58] Field of Search ................................. 340/426, 425.5, 340/428, 568, 571, 691, 825.34, 825.3, 825.31, 825.24, 825.25; 307/10.2, 10.3, 10.1; 180/287; 455/345, 346

[56] References Cited

U.S. PATENT DOCUMENTS

| | | | |
|---|---|---|---|
| 4,288,778 | 9/1981 | Zucker | 340/426 |
| 4,494,114 | 1/1985 | Kaish | 340/426 |
| 4,683,462 | 7/1987 | Takeda et al. | |
| 4,720,700 | 1/1988 | Seibold et al. | |
| 4,734,896 | 3/1988 | Soma et al. | 340/568 |
| 4,743,894 | 5/1988 | Bochmann | 340/691 |
| 4,808,981 | 2/1989 | Seibold | 340/568 |
| 4,866,416 | 9/1989 | Holzhauer et al. | |
| 5,245,330 | 9/1993 | Wassink | 307/10.2 |
| 5,323,139 | 6/1994 | Isaki et al. | 340/426 |
| 5,349,326 | 9/1994 | Yamada | 340/426 |
| 5,548,163 | 8/1996 | French | 180/287 |
| 5,554,966 | 9/1996 | Iijima et al. | 340/426 |

*Primary Examiner*—Nina Tong
*Attorney, Agent, or Firm*—Roland A. Fuller, III

[57] ABSTRACT

An anti-theft device for an automobile audio system automatically prevents the audio system from functioning whenever the audio system is removed from its authorized vehicle and placed into another vehicle. This anti-theft device includes a microprocessor which operates with a bus interface for communicating a vehicle identifier from a vehicle multiplex bus to the central microprocessor. The device also has non-volatile memory within which the first received or authorized vehicle identifier is stored. The subsequently received identifiers are stored on RAM. A battery detector connected to the microprocessor alerts the microprocessor whenever the audio system has been disconnected from the battery source. When the audio system is reconnected to the battery source, the microprocessor automatically compares the vehicle identifier stored within the non-volatile memory to the subsequent vehicle identifier received in the RAM over the multiplex bus, and shuts down the audio system whenever these two vehicle identifiers do not match.

25 Claims, 6 Drawing Sheets

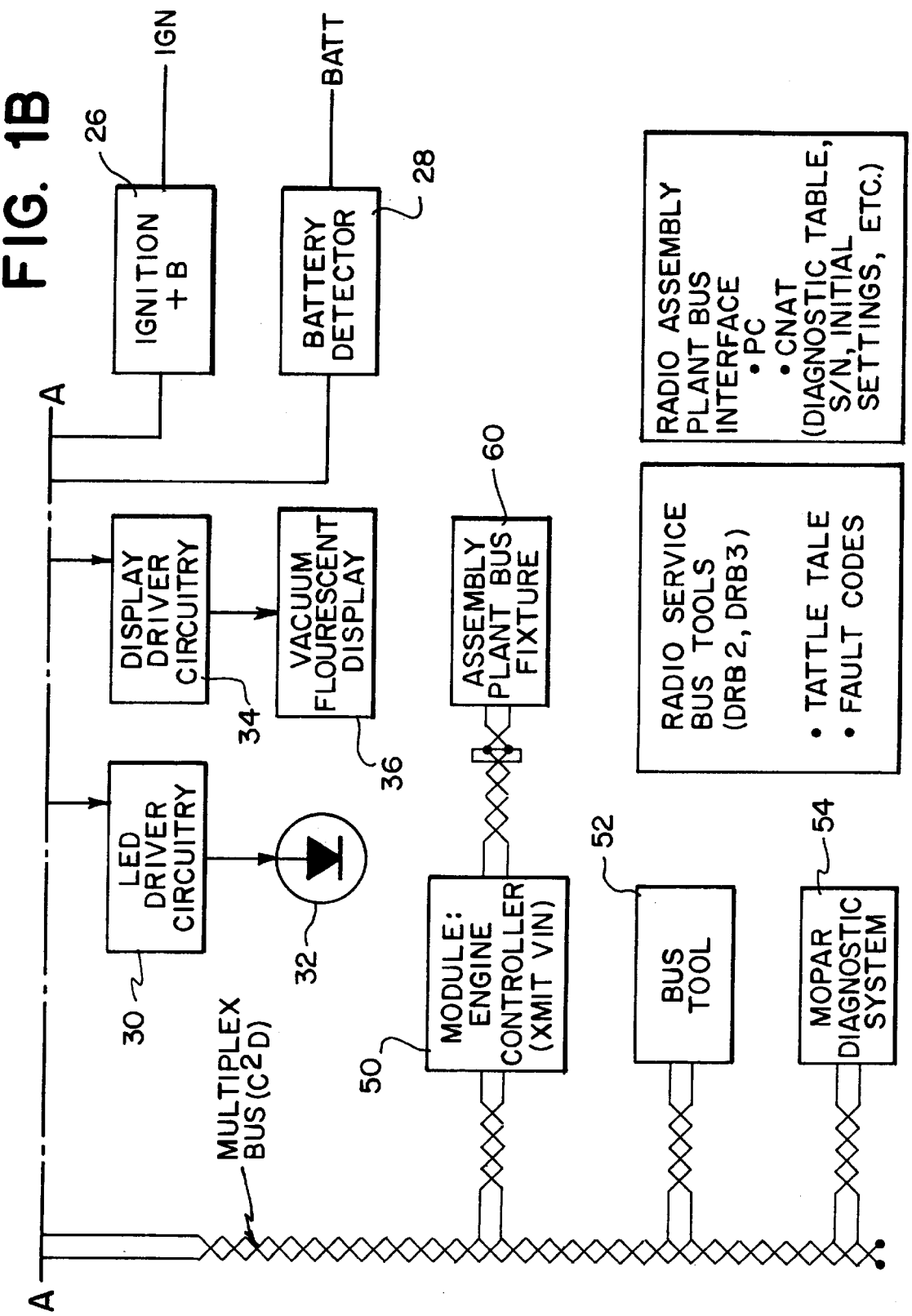

AUTOMOTIVE RADIO ANTI-THEFT DEVICE VIA MULTIPLEX BUS

FIELD OF THE INVENTION

This invention relates to a device for protecting audio equipment installed in a vehicle and, more particularly, to a device which compares a vehicle code transmitted via a multiplex bus, with one stored within the non-volatile memory of its audio equipment, and, whenever the two codes do not match, inhibits the audio equipment from operating.

BACKGROUND OF THE INVENTION

Because audio equipment installed in vehicles are essentially expensive, light weight and small in size, audio equipment has historically been the subject of much theft. With the thriving aftermarket network, the stolen equipment may be installed in almost any other vehicle.

Automobile manufacturers have employed numerous methods to prevent the audio equipment from being stolen out of the vehicles. For ease of description, the audio equipment will be referred to as a car radio. It is, however, understood that the audio equipment would encompass any sound system installed within an automobile, including cassette tapes and compact disc ("CD") players. One such method employed by automobile manufacturers to reduce car radio theft is to use special security screws to fasten the radio to the vehicle. These screws may only be unfastened using specially adapted tools.

Another method used to prevent audio equipment theft is to equip the car radio with a security code and a flashing anti-theft LED. Such a system requires the operator to manually input a multi-digit security code to "unlock" the car radio whenever the radio has been disconnected from the vehicle battery. A variation of this anti-theft method is to allow for after-market initialization of the car radio. Here, the consumer inputs a security code into the car radio's memory during initialization. Once the car radio is disconnected from its power source, for example, the car battery, the radio locks up. The operator must then reinsert the same security code to unlock the car radio. For example, U.S. Pat. No. 4,720,700 to Seibold et al., U.S. Pat. No. 4,743,894 to Bochmann, and U.S. Pat. No. 4,683,462 to Takeda et al. all disclose car radio security systems that automatically sense whenever the car radio is disconnected from its power source. Whenever the operating voltage is interrupted, the car radio shuts off until a code word, known only to the authorized user, is reentered by the authorized user. Similarly, U.S. Pat. No. 4,808,981 to Seibold discloses an automotive electronic communication apparatus which prevents the connection of an external battery to a car radio prior to stealing it, in order to prevent an interruption in the power supplied to the car radio. Here, the system measures the impedance of a connected accessory, for example the loudspeaker, and if the impedance of the loudspeaker does not match the impedance stored in the memory of the car radio, the radio will not operate, until the appropriate code word is reinserted.

Yet another method used to prevent car radio theft is to equip the car radio with a removable face plate. Whenever the operator leaves the vehicle, the operator removes the radio face plate, thereby rendering the car radio inoperative. Along these same lines, removable radios have also been designed. Here, the customer removes the entire radio when leaving the vehicle.

Each of these prior art methods are either cumbersome or inconvenient to the consumer. For the methods where the radio, or parts of the radio, are removed from the vehicle, the consumer is required to carry the radio around with him/her. For the methods employing a security code, the consumer is required to memorize this security code in order to "unlock" a radio which has been removed from a permanent power source. Also, the security code would have to be reentered every time the battery is changed or disconnected for ordinary maintenance of the vehicle.

OBJECT OF THE INVENTION

It would, therefore, be desirable to provide an anti-theft device which automatically determines whether the audio equipment is installed within an authorized vehicle, before allowing the radio to operate normally.

SUMMARY OF THE INVENTION

The present invention is directed towards providing automatic anti-theft protection without any consumer action. The anti-theft device of the present invention is primarily directed toward protecting an automobile audio system by automatically preventing the audio system from functioning whenever the audio system is removed from its authorized vehicle and placed into another vehicle. The anti-theft device comprises a central microprocessor containing memory for storing a vehicle identifier (e.g. the VIN or vehicle identification number), a battery detector connected to the central microprocessor for alerting the central microprocessor whenever the audio system has been disconnected from the battery source, a bus interface IC connected to the central microprocessor for communicating the vehicle identifier from a vehicle multiplex bus to the central microprocessor, and non-volatile memory within the radio which is used to store the authorized vehicle identifier.

Whenever the audio system is disconnected from the battery source it is locked and cannot be used. When it is reconnected to the vehicle, the central microprocessor automatically compares the vehicle identifier stored within the vehicle circuits to the authorized vehicle identifier stored in non-volatile memory of the audio system, and keeps the audio system shut down whenever these two vehicle identifiers do not match.

BRIEF DESCRIPTION OF THE DRAWINGS

The foregoing and other features of the present invention will be more readily apparent from the following detailed description and drawings of an illustrative embodiment of the invention in which:

FIG. 1 divided into FIGS. 1A and 1B, is a circuit diagram of an anti-theft device according to the present invention.

DETAILED DESCRIPTION OF THE INVENTION

The invention is described with reference to a car radio as the audio equipment installed inside the automobile. However, the invention would be equally applicable to any audio equipment installed inside a vehicle, for example, a cassette player or a compact disc player.

Figure 1A:
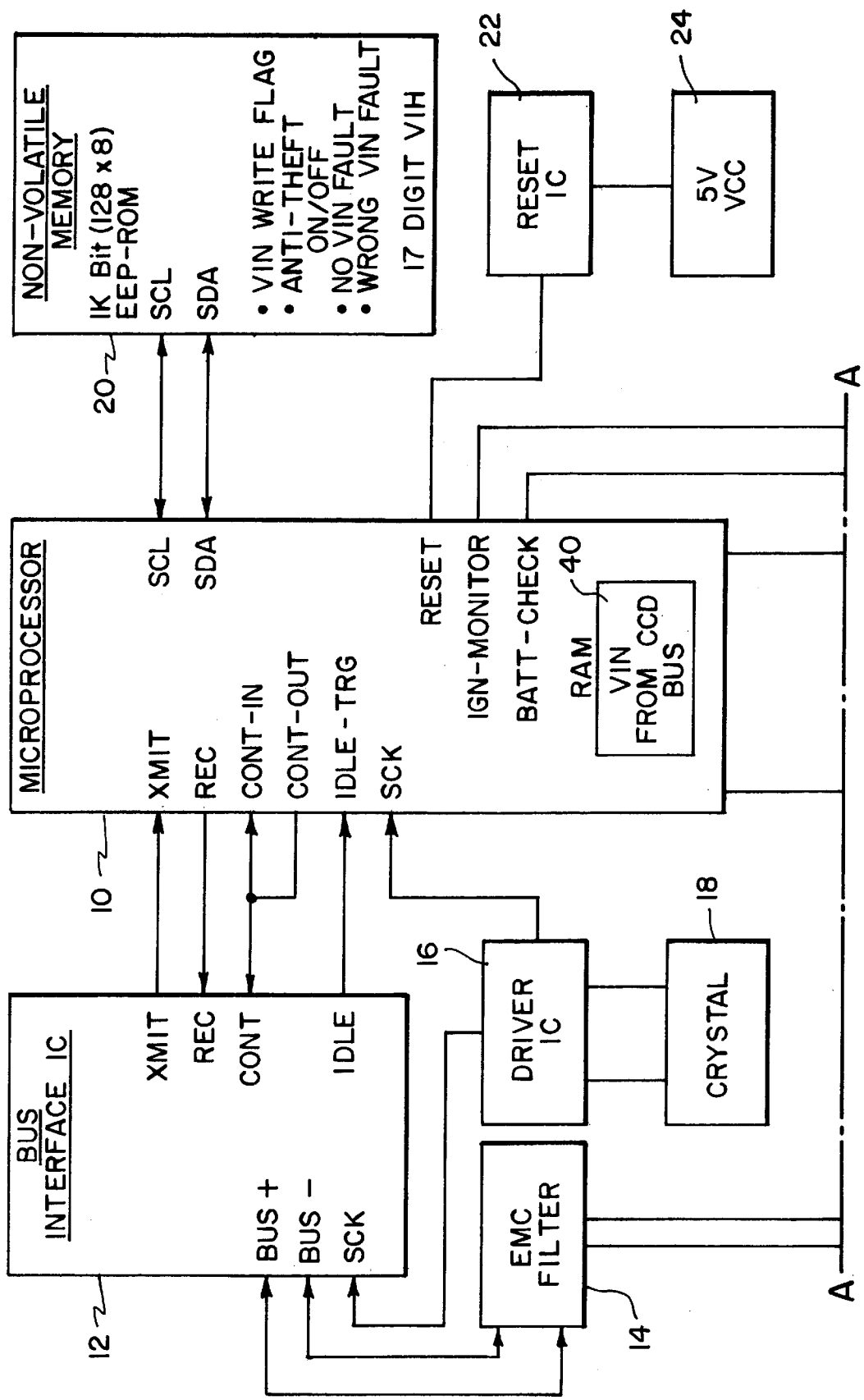

FIG. 1 illustrates a car radio which incorporates the anti-theft device, according to the present invention. As shown in FIG. 1A, a central microprocessor 10 of the anti-theft device is connected to an automotive serial bus 11 via a bus interface integrated circuit ("IC") 12 and a filter 14. In the preferred embodiment of the invention, the automotive serial bus 11 is a multiplex bus of medium speed, designated the "CCD" bus. This CCD bus is intended for data transfer between microprocessors of different modules. Information like the vehicle system descriptions, data types, message formats, hardware interfacing requirements, bus speeds, etc. are transmitted between the various microprocessors using the multiplex bus. All microprocessors connected to the CCD bus may receive messages sent on the bus.

According to the present invention, the central microprocessor 10 of the anti-theft device in the radio uses the vehicle identification number (hereinafter "VIN") to synchronize the anti-theft device within the car radio to its authorized vehicle. An engine controller module 50 transmits the VIN onto the CCD bus. To initialize the anti-theft device, the central microprocessor 10 receives the VIN from the CCD bus via the bus interface IC 12, and ultimately stores this authorized VIN in the non-volatile memory 20 within the car radio. This process will be explained in greater detail below. The central microprocessor 10 also contains a random access memory ("RAM") chip 40 for temporarily storing a subsequently received VIN while the anti-theft device determines whether this subsequently received VIN matches the authorized VIN stored in the non-volatile memory 20. Whenever the two VINs are not matched, the anti-theft device directs the car radio to shut down.

The central microprocessor 10 is also connected to LED driver circuitry 30 and Display driver circuitry 34. The LED driver circuitry 30 illuminates an anti-theft LED 32 on the car radio face plate whenever the anti-theft device is operating. This provides a warning to potential thieves that the car radio is protected by the anti-theft device. In the event that the radio is shut down by the anti-theft device, the Display driver circuitry 34 displays a "Loc.d" message on the radio display, for example, a vacuum fluorescent display 36. This signals the operator that the car radio is not defective, but rather has been rendered inoperative by the anti-theft device.

Also attached to the central microprocessor 10 is a battery detector 28. This allows the anti-theft device to determine whenever the car radio has been removed from the car battery for a predetermined period of time.

Figure 2A:
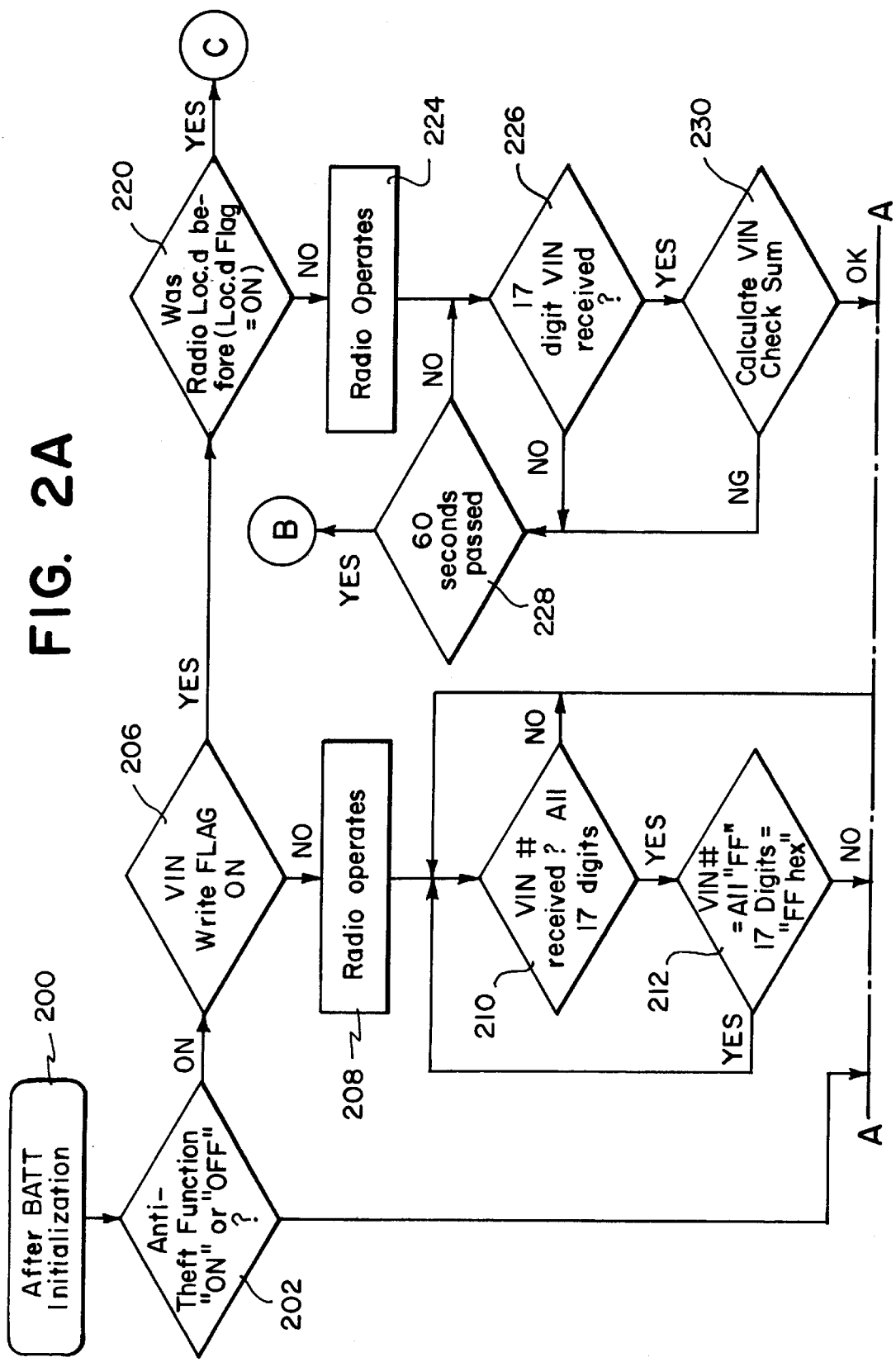
FIGS. 2A, 2B and 2C, is a flow chart showing the preferred sequence of operations performed by the device of FIG. 1.
Figure 2B:
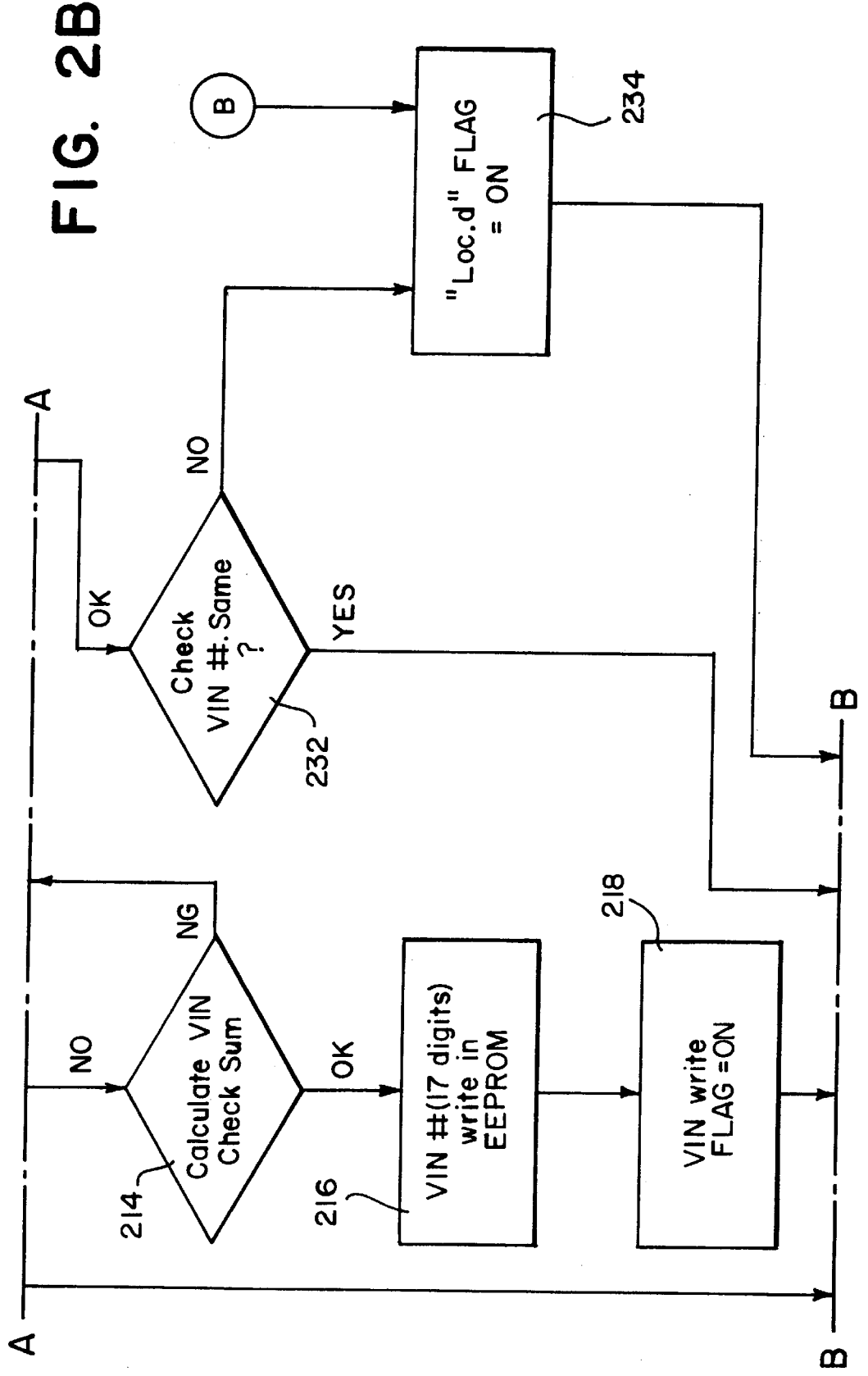

Referring to the flow chart illustrated in FIG. 2, battery initialization (step 200) occurs when the battery is first connected to the car radio, or when the battery is reconnected to the radio after the battery has been removed for any reason. The anti-theft device within the car radio automatically performs an internal check to determine whether the "anti-theft" function is armed (step 202). Typically, the anti-theft device is in the armed position. However, the dealer or the manufacturer may disarm the anti-theft device using a specialized disarming tool (not shown). If the anti-theft function is not armed (step 202), the car radio will operate normally whenever the radio is turned on (step 204).

If the anti-theft function is armed, the system searches its non-volatile memory to determine whether the "identification flag" is set (step 206). In the preferred embodiment of the invention, the unique vehicle identification is a seventeen (17) digit VIN. Hence the identification flag is hereinafter referred to as the "VIN write flag." When the VIN write flag is in the OFF position the radio will operate (step 208) while the anti-theft device attempts to set the VIN write flag to ON (steps 210–218). The VIN write flag will be turned to the OFF position when, for example, the car radio is first installed in an authorized vehicle. At this stage, the car radio has not yet received its first operable VIN and, therefore, the VIN write flag is OFF. Also, a dealer or manufacturer may place the VIN write flag to the OFF position when, for example, resetting the anti-theft device after the device "locks up" the car radio. This feature will be explained in greater detail below.

Referring to step 210, the microprocessor 10 continuously monitors its RAM 40 to determine whether all 17 digits of the VIN have been received. In the event that the automobile is not equipped with a compatible CCD bus, or its equivalent, no VIN will be transmitted. Because the anti-theft device remains at step 210 until all 17 digits of the VIN are received, the radio will continue to operate. This feature allows a car radio equipped with the anti-theft device to still operate in an authorized vehicle when the vehicle is not equipped with a CCD bus, or its equivalent.

Once all 17 digits are received by the microprocessor 10, it determines whether the VIN is indeed a proper VIN as opposed to a "dummy" VIN, for example, a VIN containing all "FF hex" digits (step 212). In operation, a dummy VIN would be present when the automobile is first hooked up to the engine computer, since the unique VIN would not yet have been assigned to the vehicle. If the VIN is, in fact, a dummy VIN, the anti-theft device allows the radio to operate normally. This provides for normal operation of the car radio while the vehicle is on the assembly line, before an actual VIN is assigned to the vehicle.

Once the microprocessor 10 detects that all 17 digits have been transmitted to, and stored within the RAM 40, the microprocessor then calculates the "VIN CheckSum" (step 214). The VIN CheckSum provides a means for confirming that the transmitted VIN is indeed an authorized vehicle identification number and not simply 17 randomly chosen digits. In the preferred embodiment, the digit corresponding to the VIN CheckSum is the ninth digit in the string of 17 digits collectively comprising the VIN. This VIN CheckSum value is calculated as follows: (1) assign each number in the VIN its actual mathematical value, and assign each letter the value specified for it, for example, the letter "E" will be assigned a value of 5; (2) multiply the assigned value for each character in the VIN by an arbitrarily chosen position weight factor which corresponds to the position of the character in the VIN; (3) multiply the check digit by zero (0); (4) add the resulting products and divide the total by 11; (5) the remainder becomes the check digit. If the remainder is 10, the check digit is assigned an "X".

After calculating the VIN CheckSum the microprocessor 10 writes the newly received VIN to the non-volatile memory 20, which, in the preferred embodiment, uses standard EEPROM technology (step 216). The VIN write flag is then set to ON (step 218). During this entire cycle (steps 210–218) the car radio is permitted to operate normally.

If, however, the VIN write flag is already set to the ON position (step 206), which would be the case if the car radio had already received an operable VIN, then the anti-theft device check queries its non-volatile memory 20 to determine whether the "Loc.d" flag is in the ON position (step 220). This would indicate that the radio has been "locked up" by the anti-theft device. Such a situation would occur when, for example, a transmitted VIN did not match the VIN previously stored in the non-volatile memory 20, or when the VIN was not transmitted within a predetermined time period (explained below). If the "Loc.d" flag is in the ON position, the car radio is directed to begin the radio shut down procedures (step 222). The radio shut down procedures will also be explained in detail below.

If at step 220 the Loc.d flag is in the OFF position, then the radio will operate normally (step 224) while the anti-theft device determines whether the VIN received (1) is valid, and (2) matches the VIN stored in its non-volatile memory (steps 226–232). First, the microprocessor 10 determines whether the 17 digit VIN has been received (step 226) within a predetermined time period, for example, 60 seconds (step 228). In this example, if the microprocessor 10 has not received the 17 digit VIN within 60 seconds, the "Loc.d" flag is turned ON (step 234) and the radio is directed to begin the radio shut down procedures (step 222). Thus, if a car radio is removed from its authorized vehicle and placed in any vehicle which does not have the capability of transmitting a VIN to the microprocessor 10, then the radio will operate for a maximum time of 60 seconds before shutting itself off.

If, however, the VIN is received and the data stored in the RAM within the microprocessor 10, the microprocessor 10 calculates the VIN CheckSum value (step 230) to determine whether these 17 digits result in an authorized VIN which this anti-theft device should recognize (process explained above). If the VIN CheckSum value does not correspond to a valid VIN, the central microprocessor 10 concludes that no VIN was received. Thus, after 60 seconds, the Loc.d flag is turned ON, and the radio is again directed to shut itself down (step 222).

After the VIN Checksum is found to be valid, the anti-theft device compares the VIN presently stored in its RAM 40 to the VIN previously stored within the EEPROM, and determines whether they match. If they do not match, the Loc.d flag is once again turned ON and the car radio is shut down (step 222). If the VINs match, the car radio is permitted to function normally (step 204).

The radio shut down procedure (step 222) is explained as follows. First, the radio's vacuum fluorescent display 36 displays a "Loc.d" message (step 250). In this mode, the operator may only use the EJECT function on the audio equipment (step 252). This function would not be applicable to a car radio unless the radio was also equipped with a cassette player or a compact disc ("CD") player. The car radio will also accept all diagnostic messages and VIN messages (step 254). Preferably, the diagnostic messages are provided via a MOPAR® diagnostic system 54 (FIG. 1B). This allows an authorized dealer to (1) switch off the anti-theft function altogether. As described earlier, this would allow the car radio to operate normally. The dealer may also clear the VIN write flag and the "Loc.d" flag using the MOPAR® diagnostic system 54.

Because the anti-theft device will continue to accept all VIN messages when it is in the shut-down mode (step 254), then by resetting the VIN write flag, the anti-theft device will run through steps 206 to 218 and reinitialize the VIN in the EEPROM to the VIN of the vehicle presently housing the car radio. Thus, the presently transmitted VIN becomes the authorized VIN, and the car radio will again operate normally. If necessary, the authorized dealer may also turn off the Loc.d flag to reset the anti-theft device. In the preferred embodiment of the invention, the dealer may clear the write flag and the Loc.d flag by depressing a single "reset button" on the MOPAR diagnostic system 54.

According to the present invention, the anti-theft device continues to check whether a matched VIN is transmitted (step 256). If so, the Loc.d flag is automatically cleared, and the radio is permitted to operate normally (step 204). Therefore, even after the car radio is "locked up," the radio will unlock itself automatically whenever it is reinstalled in its original vehicle and the originally stored VIN is received by the anti-theft device. Such a situation could occur when the battery is disconnected from the radio during routine maintenance. If the operator attempts to play the car radio, the radio will lock up after 60 seconds because the VIN will not be transmitted when the engine is turned off. However, once the battery is reconnected and the ignition 26 (FIG. 1B) is turned on, the anti-theft device will quickly determine that the correct VIN has been transmitted, and the radio will function normally.

In an alternative embodiment (illustrated by the flow chart in FIG. 3), once the central microprocessor 10 determines that the VIN write flag is on (step 300; identical to previous step 206), the car radio indicates to the user that the system is primed to receive a VIN and then to compare this VIN with the previously stored VIN. For example, the word "COdE" is displayed on the radio's fluorescent vacuum display (step 302). Step 302 differs from the preferred embodiment in that the car radio is not permitted to operate while this internal "checking" function is in process. After the central micro-processor 10 determines that the VIN write flag is ON (step 300), the central micro-processor 10 checks to see whether all 17 digits of the VIN have been received (step 304). If not, the microprocessor 10 will continue to wait for the rest of the VIN for up to 60 seconds (step 306). If, however, the entire VIN has been received, the received VIN is compared with the stored VIN to determine whether the car radio is installed in an authorized vehicle (step 308). Where the two VINs match, the car radio operates normally (step 320). However, if they do not match, the radio is directed to shut itself down (step 322).

If, however, 60 seconds has passed since the ignition was turned on (step 306) and the entire VIN has not been received, the system checks to see whether three (3) ignition ("IGN") cycles have taken place (step 310). If there has not been three IGN, then the IGN count is incremented by one (step 318) and the radio functions normally (step 320). This, in effect, grants the user three grace attempts (step 310) before locking up the car radio. The purpose for these three grace periods is to accommodate the user who, after battery initialization, attempts to listen to the radio without starting the vehicle engine. In a vehicle where the VIN is not transmitted until the engine is started, no VIN will be received within the 60 second period, however, the car radio will operate normally. However, if no VIN is received after the third ignition cycle (step 310), the car radio is directed to shut down (step 322). In this embodiment, an unauthorized user who places the car radio into a vehicle which does not transmit a VIN, will be permitted to operate the radio normally during the grace periods. However, after the third ignition cycle, the car radio will shut down without further warning.

Figure 2C:
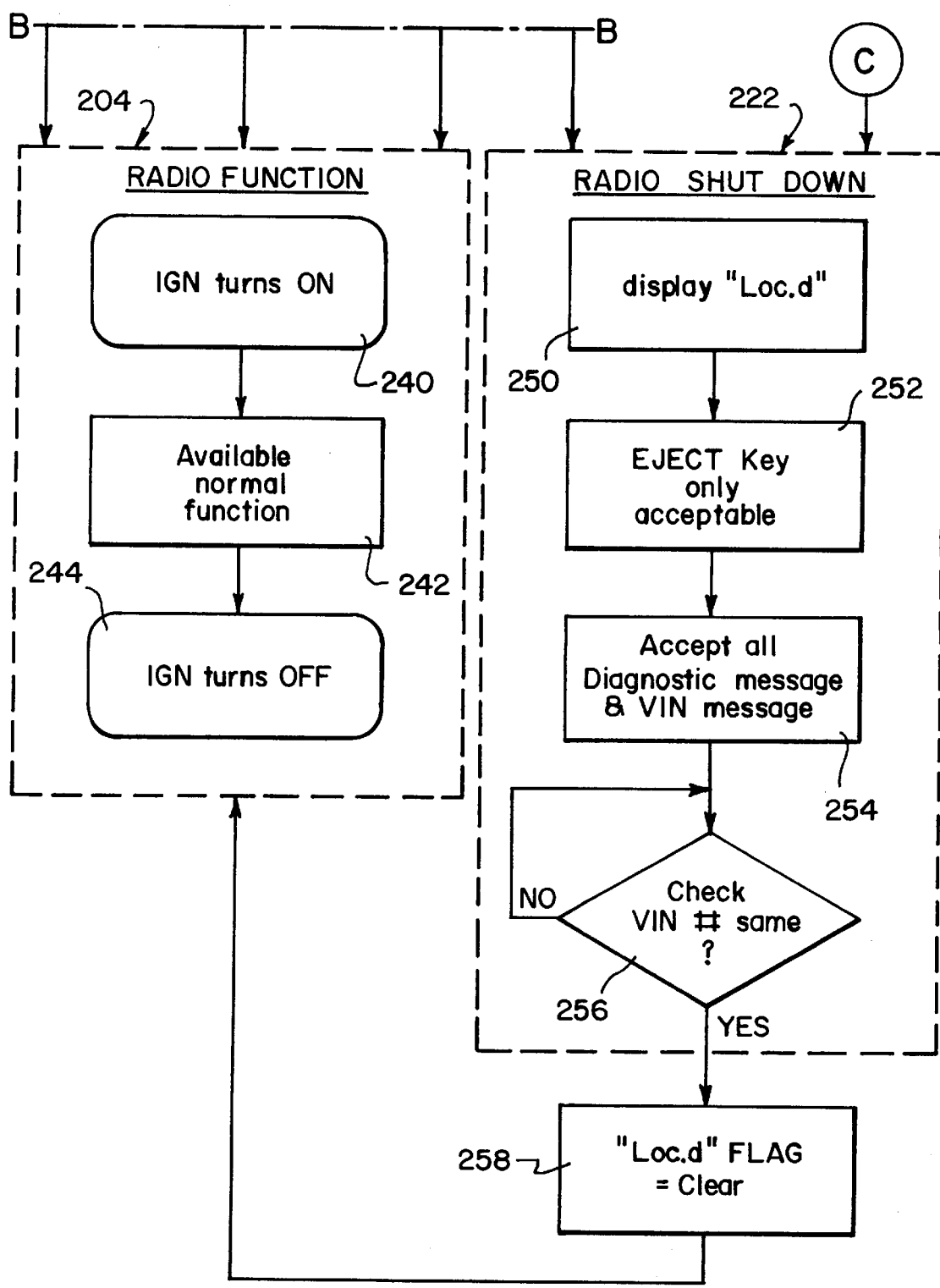
Figure 3:
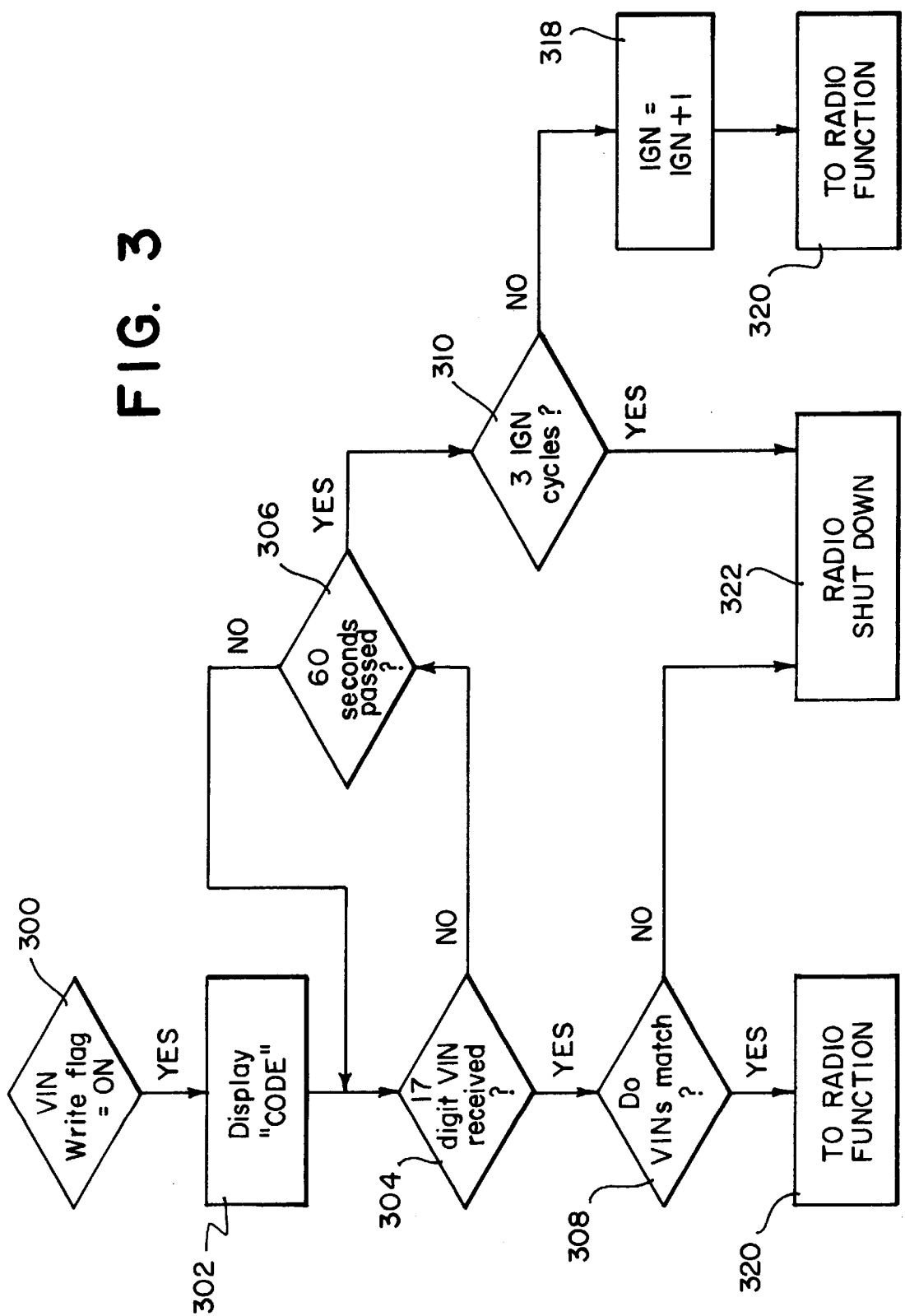
FIG. 3 is an alternative embodiment and is a flow chart.

A further variation is possible with respect to the alternate embodiment described in FIG. 3, in that, the radio shut down procedure (step 322) is the same as that described in step 222, except that the VIN is not continuously checked to determine whether a match exists (FIG. 2C). In vehicles employing this embodiment, the radio will not automatically unlock itself when the radio is installed in the authorized vehicle. Instead, the user must return to the dealer or manufacturer to have the anti-theft device reset.

In all of the embodiments, the radio stores diagnostic status and fault code information in non-volatile memory (EEPROM) 20. This information is accessible via a "read" of coded memory offset locations. Status information includes:
  (1) Anti-theft Function ON/OFF Flag;
  (2) VIN Write ON/OFF Flag;
  (3) Radio Loc.d ON/OFF Flag.

Diagnostic fault code information includes:
  (1) No VIN Fault Flag—no VIN received within 60 seconds (radio shut-down);
  (2) Wrong VIN Fault Flag—VIN received did not match VIN stored in memory.

The radio can also store the ignition cycle counter in non-volatile memory 20.

The status and diagnostic information is available with pre-programmed diagnostic tools (Mopar® Diagnostic System available from Chrysler Corporation) or other bus interface tools. The radio illustratively has identifying information, such as the type of radio or the manufacturer of the radio, stored in the non-volatile memory which is used to determine the coded memory offset locations in which the diagnostic and status information is stored. The diagnostic tool queries the radio and reads this identifying information and then uses corresponding "look-up" tables to determine the location of the status and diagnostic information. Consequently, the dealership technician can determine and change the status of the radio with a diagnostic tool, for example, resetting the radio. This simplifies transferring a radio from one car to another authorized car, while preventing any service difficulties.

Law enforcement agencies can also use the VIN stored in non-volatile memory to determine the original authorized vehicle of a recovered stolen radio.

While the invention has been particularly shown and described with reference to a preferred embodiment thereof, it will be understood by those skilled in the art that various changes in form and details may be made therein without departing from the spirit and scope of the invention.

What is claimed is:

1. An anti-theft device for an automobile audio system which automatically prevents the audio system from functioning whenever the audio system is removed from its authorized vehicle and placed into another vehicle, comprising:
  the audio system having a central microprocessor, a battery detector, a bus interface, a non-volatile memory and a second memory;
  the battery detector connected to the central microprocessor, said battery detector alerting the central microprocessor whenever the audio system has been disconnected from a battery;
  the bus interface connected to the central microprocessor and a vehicle communication bus for communicating a first authorized vehicle identifier and a next subsequent vehicle identifier received via the vehicle communication bus from a source in the authorized vehicle and from a source in any vehicle, respectively to said central microprocessor, each said first authorized vehicle identifier and said next subsequent vehicle identifier being pre-stored in said source in the authorized vehicle and in said source in any vehicle, respectively;
  the first authorized vehicle identifier is recieved and stored in said non-volatile memory by said microprocessor only when initializing the anti-theft device;
  whenever the battery detector determines that the audio system has been disconnected from the battery and reconnected, said next subsequent vehicle identifier is automatically recieved and stored in said second memory by said microprocessor, and then
  said microprocessor automatically compares the first authorized vehicle identifier stored within the non-volatile memory to the next subsequent vehicle identifier stored in said second memory, and shuts down the audio system whenever the first authorized and the next subsequent vehicle identifiers do not match.

2. The anti-theft device as described in claim 1, wherein the vehicle identifiers are 17 digit vehicle identification numbers.

3. The anti-theft device as described in claim 2, wherein one of the digit of the 17 digit vehicle identification numbers is designated as a check value, for confirming whether the 17 digits received by the central microprocessor correspond to a valid vehicle identification number.

4. The anti-theft device as described in claim 2, wherein the non-volatile memory comprises EEPROM.

5. The anti-theft device as described in claim 1, further comprising LED driver circuitry that is connected to the microprocessor, said LED driver circuitry relaying the status of the anti-theft device to an operator.

6. The anti-theft device as described in claim 1, further comprising display driver circuitry connected to the microprocessor, said display circuitry relaying status messages to an operator.

7. The anti-theft device as described in claim 1, wherein the audio system is a car radio.

8. The anti-theft device as described in claim 1, wherein the audio system is a combination of both a car radio and a cassette player.

9. The anti-theft device as described in claim 1, wherein the audio system is a combination of a car radio, a cassette player, and a compact disc player.

10. The anti-theft device as described in claim 1, further comprising an ignition cycle counter, stored in the non-volatile memory.

11. The anti-theft device as described in claim 1, wherein said non-volatile memory includes coded memory offset locations in which diagnostic status and fault code information is stored.

12. The anti-theft device as described in claim 11, wherein the diagnostic status includes an Anti-Theft Function ON/OFF Flag, a vehicle identification number Write ON/OFF Flag, and a Radio Loc'd ON/OFF Flag and the fault code information includes a No vehicle identification number Fault Flag and a Wrong vehicle identification number Fault Flag.

13. The anti-theft device as described in claim 11 wherein the non-volatile memory includes identifying information stored therein which is readable via the bus interface to facilitate determination of the coded memory offset locations in which the diagnostic status and and fault code information is stored.

14. A method for initializing an anti-theft device installed within an automobile audio system, comprising the steps of:
  automatically transmitting over a vehicle communication bus to which the audio system is coupled a vehicle identifier to a microprocessor located within the audio system from a source in a vehicle in which the vehicle identifier is pre-stored;
  confirming that the vehicle identifier is in fact valid; and
  storing the vehicle identifier in a memory location within the anti-theft device,
  wherein the vehicle identifier is a unique vehicle identification number;

wherein the step of confirming that the vehicle identification number is in fact valid further comprises the steps of:
classifying one digit of the vehicle identification number as a check digit;
automatically calculating a check value by using each digit within the unique vehicle identification number;
assigning the check value to the check digit, and storing the check value within the anti-theft device.

15. The method for initializing the anti-theft device as described in claim 14, wherein the unique vehicle identification number contains 17 digits.

16. A method for performing a security check using an anti-theft device installed within an automobile audio system, comprising the steps of:
confirming that the anti-theft device has previously been initialized by checking to see whether a first vehicle identifier has been stored within the anti-theft device;
automatically receiving a second vehicle identifier from a vehicle multiplex bus, on which it has been transmitted from a source in a vehicle in which the second vehicle identifier has been pre-stored, at least as often as every time the ignition is turned on;
continuously comparing the second vehicle identifier to the first vehicle identifier, to ensure that the first and second vehicle identifiers match; and
shutting down the audio system whenever a discrepancy between the first and second vehicle identifiers is detected.

17. The method for performing the security check using the anti-theft device installed within the automobile audio system as described in claim 16, wherein the first and second vehicle identifiers are vehicle identification numbers.

18. The method for performing the security check using the anti-theft device installed within the automobile audio system as described in claim 17, wherein the vehicle identification numbers contains 17 digits.

19. The method for performing the security check using the anti-theft device installed within the automobile audio system as described in claim 18, further including the steps of confirming that the second vehicle identifier is a valid identifier, confirming that the vehicle identification number of said first vehicle identifier is in fact valid further comprises the steps of:
classifying one digit of the vehicle identification number as a check digit location;
automatically calculating a check value from each digit within the vehicle identification number; and
comparing the calculated check value to the number contained in the check digit location, to confirm that the calculated check value is valid.

20. The method for performing the security check using the anti-theft device installed within the automobile audio system as described in claim 19, wherein automatically calculating the check value further comprises the steps of:
assigning each number in the vehicle identification number its mathematical value;
assigning each letter in the vehicle identification number a specific value;
multiplying the assigned values for each character in the vehicle identification number by an arbitrarily chosen position weight factor which corresponds to the position of the character in the vehicle identification number to obtain resulting products;
adding the resulting products to obtain a total and dividing the total by an arbitrarily chosen value;
designating a remainder of the divided total as the check digit.

21. The method for performing the security check using the anti-theft device installed within the automobile audio system, as described in claim 16, wherein the audio system shut down procedure further comprises the steps of:
alerting an operator that the audio system is being shut down;
disabling all audio system functions except an eject key function, thereby allowing the operator to remove any equipment presently found inside the audio system;
continuously comparing the second vehicle identifier transmitted over the vehicle multiplex bus with the first vehicle identifier stored within the anti-theft device; and
automatically restoring normal audio system operation whenever a match between the first and the second vehicle identifiers is found.

22. The method for performing the security check using the anti-theft device installed within the automobile audio system, as described in claim 21, wherein the operator is visually alerted that the audio system will be shut down.

23. A method for performing a security check using an anti-theft device installed within an automobile audio system, comprising the steps of:
confirming that the anti-theft device has previously been initialized by checking to see whether a first vehicle identifier has been stored within the anti-theft device;
alerting a user that the anti-theft device is performing its security check;
automatically receiving a second vehicle identifier from a vehicle multiplex bus, on which it has been transmitted from a source in a vehicle in which the second vehicle identifier has been pre-stored, at least as often as every time the ignition is turned on;
comparing the second vehicle identifier to the first vehicle identifier, to ensure that the first and second vehicle identifiers match; and
shutting down the audio system whenever a discrepancy between the first and second vehicle identifiers is detected.

24. The method for performing the security check using the anti-theft device installed within the automobile audio system, as described in claim 23, further comprising the steps of:
setting a timer for a predetermined period as the ignition is turned on;
determining whether the second vehicle identifier has been received by the anti-theft device within the predetermined period, and if the second vehicle identifier has not been received and the ignition has been cycled more than a predetermined number of times; then
directing the automobile audio system to shut itself down.

25. The method for performing the security check using the anti-theft device installed within the automobile audio system, as described in claim 23, wherein the audio system shut down procedure further comprises the steps of:
alerting an operator that the audio system is being shut down;
disabling all audio system functions except an eject key function, thereby allowing the operator to remove any equipment presently found inside the audio system; and
maintaining the audio system in a shut-down state until the anti-theft device is reset.

* * * * *